US009026976B2

(12) United States Patent
Alpert et al.

(10) Patent No.: US 9,026,976 B2
(45) Date of Patent: May 5, 2015

(54) CONGESTION AWARE ROUTING USING RANDOM POINTS

(75) Inventors: Charles Jay Alpert, Austin, TX (US); Zhuo Li, Austin, TX (US); Chin Ngai Sze, Austin, TX (US); Yaoguang Wei, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 13/445,150

(22) Filed: Apr. 12, 2012

(65) Prior Publication Data

US 2013/0272126 A1 Oct. 17, 2013

(51) Int. Cl.
*G06F 17/50* (2006.01)
*H04L 12/24* (2006.01)
*H04L 12/729* (2013.01)

(52) U.S. Cl.
CPC ............ *H04L 41/145* (2013.01); *H04L 45/125* (2013.01)

(58) Field of Classification Search
USPC .................. 716/119, 126, 129, 130, 131, 135
See application file for complete search history.

(56) References Cited

U.S. PATENT DOCUMENTS

| 5,550,748 | A  | * | 8/1996  | Xiong ............................ 716/129 |
| 5,847,965 | A  |   | 12/1998 | Cheng |
| 6,493,658 | B1 | * | 12/2002 | Koford et al. ...................... 703/1 |
| 6,766,502 | B1 | * | 7/2004  | Pyo et al. ....................... 716/129 |
| 7,257,795 | B1 |   | 8/2007  | Fung et al. |
| 7,363,607 | B2 | * | 4/2008  | Birch et al. .................... 716/113 |
| 2010/0169858 | A1 |   | 7/2010  | Betz et al. |
| 2010/0302935 | A1 |   | 12/2010 | Zhang et al. |
| 2012/0110539 | A1 | * | 5/2012  | Birch et al. ................... 716/130 |
| 2012/0297355 | A1 | * | 11/2012 | Alpert et al. .................. 716/135 |

* cited by examiner

*Primary Examiner* — Brian Ngo
(74) *Attorney, Agent, or Firm* — Garg Law Firm, PLLC; Rakesh Garg; William J. Stock

(57) ABSTRACT

In congestion aware point-to-point routing using a random point in an integrated circuit (IC) design, the random point is selected in a bounding area defined in a layout of the IC design. A set of pattern routes is constructed between a source pin and a sink pin in the bounding area, a pattern route in the set of pattern routes passing through the random point. A set of congestion cost corresponding to the set of pattern routes is computed. A congestion cost in the set of congestion costs corresponds to a pattern route in the set of pattern routes. A preferred pattern route is selected from the set of pattern routes, the preferred pattern route having the smallest congestion cost in the set of congestion costs. The preferred pattern route is output as a point-to-point route between the source pin and the sink pin.

18 Claims, 5 Drawing Sheets

CONGESTION AWARE ROUTING USING RANDOM POINTS

BACKGROUND

1. Technical Field

The present invention relates generally to a method, system, and computer program product for designing an integrated circuit (IC). More particularly, the present invention relates to a method, system, and computer program product for congestion aware point to point routing using random points.

2. Description of the Related Art

Modern day electronics include components that use ICs. ICs are electronic circuits formed using Silicon as a substrate and by adding impurities to form solid-state electronic devices, such as transistors, diodes, and resistors. Commonly known as a "chip," an IC is generally encased in hard plastic. The components in modern day electronics generally appear to be rectangular black plastic pellets with connector pins protruding from the plastic encasement.

Circuit designers use a variety of software tools to design electronic circuits that accomplish an intended task. For example, a digital circuit may be designed to accept digital inputs, perform some computation, and produce a digital output. An analog circuit may be designed to accept analog signals, manipulate the analog signals, such as my amplifying, filtering, or mixing the signals, and produce an analog or digital output. Generally, any type of circuit can be designed as an IC.

Logical synthesis, physical synthesis, and generation of a routed and timing-closed design are some of the functions of an IC design software tool. Logical synthesis is the process of designing the logical operation that is to be achieved by a circuit. Physical synthesis is the mapping, translating, or integration of that logical synthesis to the physical design components, such as logic gate and buffer circuits. Routing and timing-closed design is the design produced by adjusting the wire routings and component placements in a design so that the design meets certain design criteria such as delay or slew of signals, or wirelength restrictions.

The software tools used for designing ICs produce, manipulate, or otherwise work with the circuit layout at very small scales. Some of the components that such a tool may manipulate may only measure tens of nanometer across when formed in Silicon. The designs produced and manipulated using these software tools are complex, often including millions of such components interconnected to form an intended electronic circuitry.

The interconnects between components are called wires. A wire is a connection between parts of electronic components, and is formed using a metallic material that conducts electricity. A net is a collection of interconnections among a group of components. A wire forms a segment of a net, such as a connection between two components.

The software tools manipulate these components at the components level, or blocks of components level. A block of components is also known as a global cell, or g-cell. A g-cell in an IC design is a portion of the IC design. One way of identifying g-cells in an IC design is to overlay a grid of imaginary vertical and horizontal lines on the design, and deeming each portion of the IC design bound by horizontal and vertical lines as a g-cell. The horizontal or vertical lines bounding a g-cell are called cut-lines. A g-cell is also known as a tile.

Imposing such a grid on an IC design abstracts the global routing problem away from the actual wire implementation and gives a more mathematical representation of the task. A net may span one or more g-cells and may cross several cut lines.

An IC design software tool can, among other functions, manipulate cells, or interconnect components of one cell with components of other cells, such as to form nets. These cells are different from g-cells in that these cells are the actual logic components, such as the semiconductor gates.

Placement problem is the problem of placing the cells of a chip such that the design meets all the design parameters of the chip. Routing is the process of connecting the pins after placement. In other words, placement results in a rendering of the components of various cells as being located in certain positions in the design, whereas routing results in a rendering of how the metal layers would be populated with that placement.

A wire can be designed to take any one of the several available paths in a design. Placement of a wire on a certain path, or track, is a part of routing.

A router is a component of an IC design tool that performs the routing function. Once the placement component—known as a placer—has performed the placement function, the router attempts to connect the wires without causing congestion. For example, if a design parameter calls for no more than five wires in a given area, the router attempts to honor that restriction in configuring the wiring. Such limitations on the wiring are a type of design constraints and are called congestion constraints. Other types of design constraints may include, for example, blocked areas or blockages—cell areas where wires may not be routed.

A global router divides the routing region into g-cells and attempts to route nets through the g-cells such that no g-cell overflows its capacity. Global routing is the process of connecting a g-cell to other g-cells.

After global routing, wires must be assigned to actual tracks within each tile, followed by detail routing, which must connect each global route to the actual pin shape on the cell. Another type of router—known as the detailed router—performs the detailed routing. The global and detailed routing produced during the design process is collectively referred to as "routing" and is usually further modified during optimization of the design.

SUMMARY

The illustrative embodiments provide a method, system, and computer program product for congestion aware routing using a random point. An embodiment selects, using an application executing using a processor and a memory in a data processing system, the random point in a bounding area defined in a layout of the IC design. The embodiment constructs a set of pattern routes between a source pin and a sink pin in the bounding area, a pattern route in the set of pattern routes passing through the random point. The embodiment computes a set of congestion cost corresponding to the set of pattern routes, wherein a congestion cost in the set of congestion costs corresponds to a pattern route in the set of pattern routes. The embodiment selects a preferred pattern route from the set of pattern routes, the preferred pattern route having the smallest congestion cost in the set of congestion costs. The embodiment outputs the preferred pattern route as a point-to-point route between the source pin and the sink pin.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
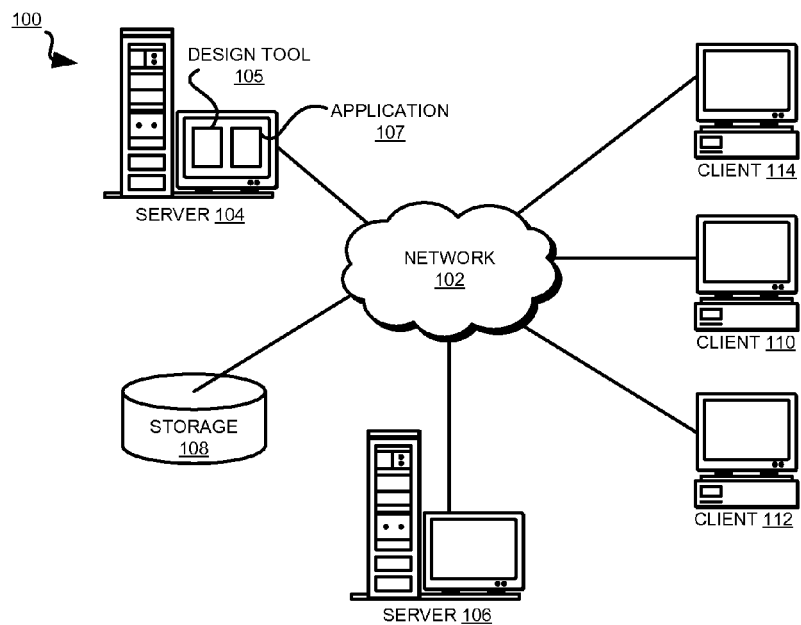
FIG. 1 depicts a pictorial representation of a network of data processing systems in which illustrative embodiments may be implemented.

IC design tools typically include or interact with a routing tool that performs the routing step of the design. The routing tool routes the nets and resolves any congestion that exceeds a congestion threshold.

A net Connects at least two connection points, or pins, in a circuit. A net that spans multiple pins essentially comprises several two-pin connections, where a set of internal points (Steiner points) may be included as well for two-pin connections, during the process of building steiner tree for a multi-pin nets. Therefore, routing a net in an IC design layout is essentially a point-to-point routing problem.

The illustrative embodiments recognize that any number of paths is possible between two points in a given area of a circuit. The illustrative embodiments further recognize that not all point-to-point routing possibilities through an area of a circuit are desirable. For example, a scenic route with numerous bends may make the wirelength of a route undesirable. As another example, a straight route between two pins may have the shortest wirelength for the route but may cause the route to pass through a region whose congestion would exceed a threshold due to the addition of the route. A routing tool has to consider many other limitations on the point-to-point routing to select a route between two pins in a circuit.

A typical IC includes millions or hundreds of millions of components. Presently available routing tools evaluate millions, and sometimes tens of millions, of point-to-point routes during point-to-point routing, making point-to-point routing a computationally expensive exercise. Presently available routing tools have no effective way of limiting the search for point-to-point routes, except exploring a vast range of possible routes, rejecting few routes due to known issues such as blockages, computing the congestion values and other characteristics of the large set of remaining routes, and selecting a point-to-point route from that large set that best satisfies the design constraints.

The illustrative embodiments recognize that an acceptable point-to-point routing solution need not be the best point-to-point routing solution between two pins, but only a solution that satisfies certain design constraints. Accordingly, the illustrative embodiments recognize that presently used method of point-to-point routing are wasteful of computing resources because they essentially amount to a computationally expensive exhaustive search for a best point-to-point routing solution, which is repeated millions of times in routing a typical IC design layout.

The illustrative embodiments used to describe the invention generally address and solve the above-described problems and other problems related to point-to-point routing. The illustrative embodiments provide a method, system, and computer program product for congestion aware routing using random points in an IC design layout.

While some embodiments are described with respect to certain numbers of points and certain shapes of bounding areas, an implementation may use an embodiment with any number of points and bounding areas of any shape without departing the scope of the invention. For example, an implementation of an embodiment may form a point-to-point route using two or more random points in an irregular or non-geometric shape within the scope of the illustrative embodiments.

The illustrative embodiments are described with respect to certain ICs or circuits only as examples. Such descriptions are not intended to be limiting on the invention. For example, an illustrative embodiment described with respect to a microprocessor design can be implemented with respect to a design of a memory or another type of circuit without limitation.

The illustrative embodiments are described with respect to certain data, data structures, file-systems, file names, directories, and paths only as examples. Such descriptions are not intended to be limiting on the invention. For example, an illustrative embodiment described with respect to a local application name and path can be implemented as an application on a remote path within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
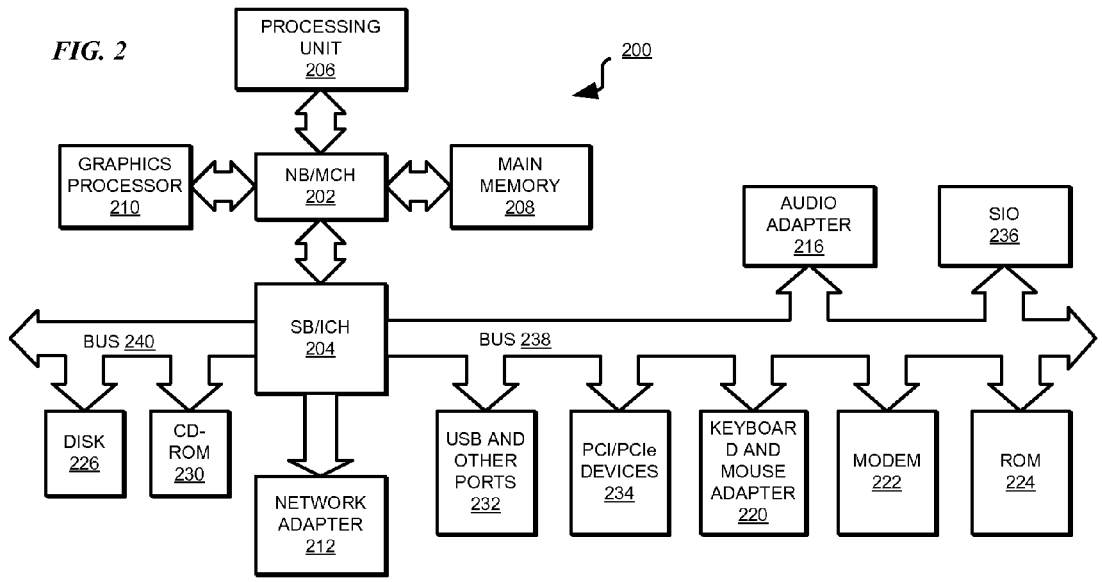
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Any data processing system, such as server 104, may include design tool 105 that may be improved using an embodiment. Design tool 105 may be any suitable software application for designing ICs. Application 107 may be any combination of hardware and software usable for implementing an embodiment of the invention such that the embodiment is usable with design tool 105 for congestion aware point-to-point routing using random points.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/NCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
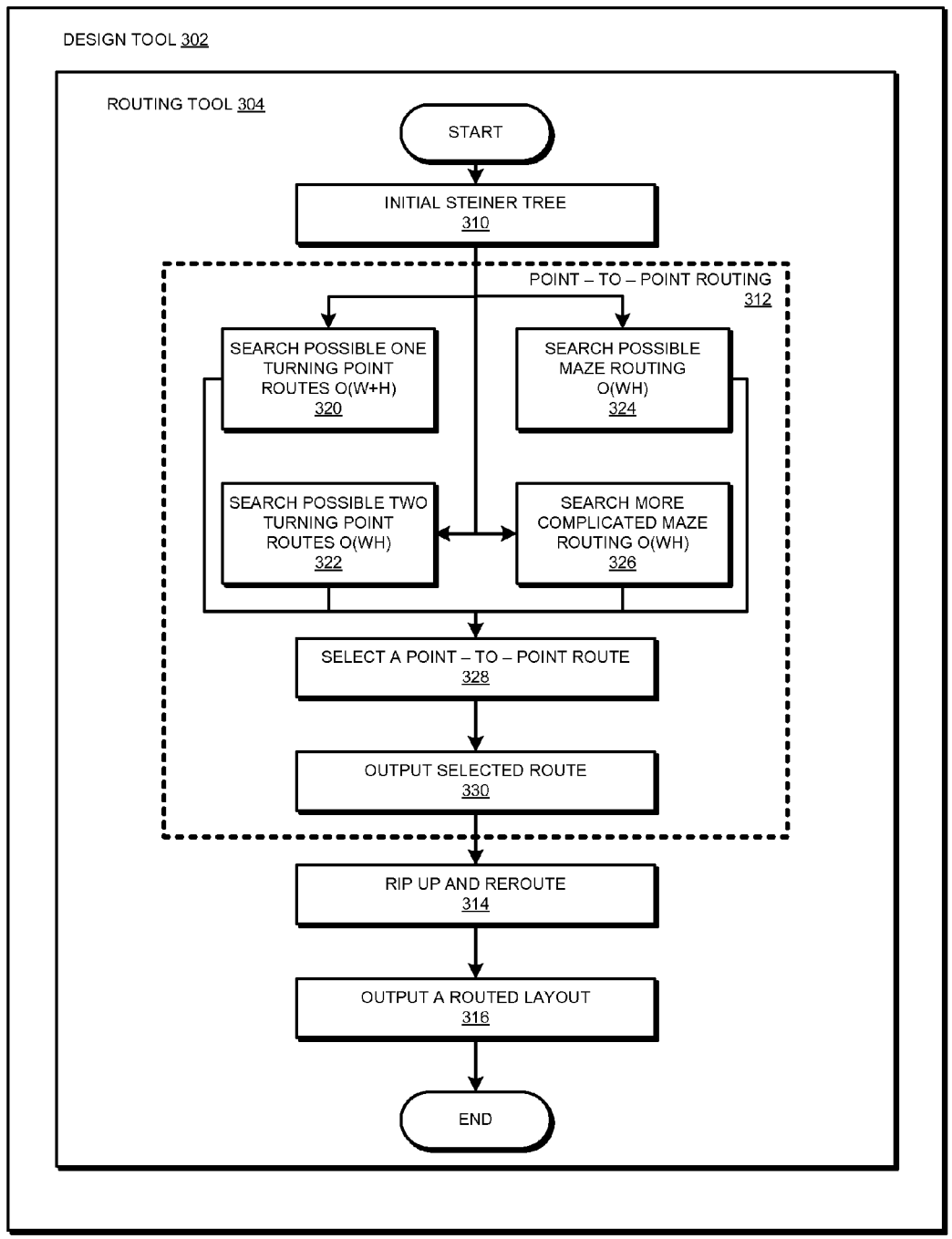
FIG. 3 depicts a block diagram of an example point-to-point rerouting process that can be improved using an illustrative embodiment.

With reference to FIG. 3, this figure depicts a block diagram of an example point-to-point rerouting process that can be improved using an illustrative embodiment. Design tool 302 is analogous to design tool 105 in FIG. 1. Routing tool 304 is an example existing routing tool that can be improved to solve congestion problems using net grouping and information sharing according to an embodiment.

Routing tool 304 either computes certain aspects of an IC design, or receives those aspects from design tool 302 in the form of inputs. For example, routing tool 304 may compute the g-cells grid and a netlist for an IC design to route the design. Routing tool 304 may similarly obtain or compute a congestion model, g-cell capacities, wiring demand, and blockage information, for use in the routing process. Routing tool 304 may also obtain or compute any number and type of thresholds, for example, a congestion threshold and a wirelength bound, applicable for point-to-point routing in a given IC design. A congestion threshold is a limit on how congested a g-cell is allowed to become in an acceptable routing solution.

A wirelength bound is a limit on the length of a net or net segment. For example, in one embodiment, a wirelength bound may specify a scenic ratio constraint, which a critical net should not exceed in an acceptable routed design.

Presently, routing tool 304 delivers an acceptable routed IC design layout in three broad steps. Routing tool 304 constructs an initial Steiner tree for the given g-cells and nets (step 310). Routing tool 304 perform point-to-point routing for the nets after decomposing the original multi-pin nets to a series of two-pin connections that including Steiner points (step 312). Routing tool performs rip up and reroute operations to solve any congestion problems (step 314): Routing tool outputs a routed IC design layout that satisfies design specifications and constraints (step 316).

As described earlier, prior art routing tool 304 disadvantageously performs point-to-point routing at step 312 by performing an expensive search of a near-exhaustive set of potential point-to-point routing solutions for each pin pair. Presently, for point-to-point routing at step 312, prior art routing tool 304 searches possible straight routes (not shown), routes with one turning point (also known as L routes) (step 320), routes with two turning points (also known as Z routes) (step 322), maze routing up to a certain number of turns (step 324), more complicated maze routing (step 326), or a combination thereof.

Routing tool 304 selects a point-to-point route, usually the best solution from the searches including steps 320-326 that complies with the design constraints, (step 328). Routing tool 304 outputs the selected route as the point-to-point route between the two pins in question (step 330). Thus, as the illustrative embodiments recognize and solve, prior art routing tool 304 incurs unnecessary computations in generating the point-to-point routing that meets the congestion threshold, wirelength bound, and other constraints on the acceptability of the IC design layout.

Figure 4:
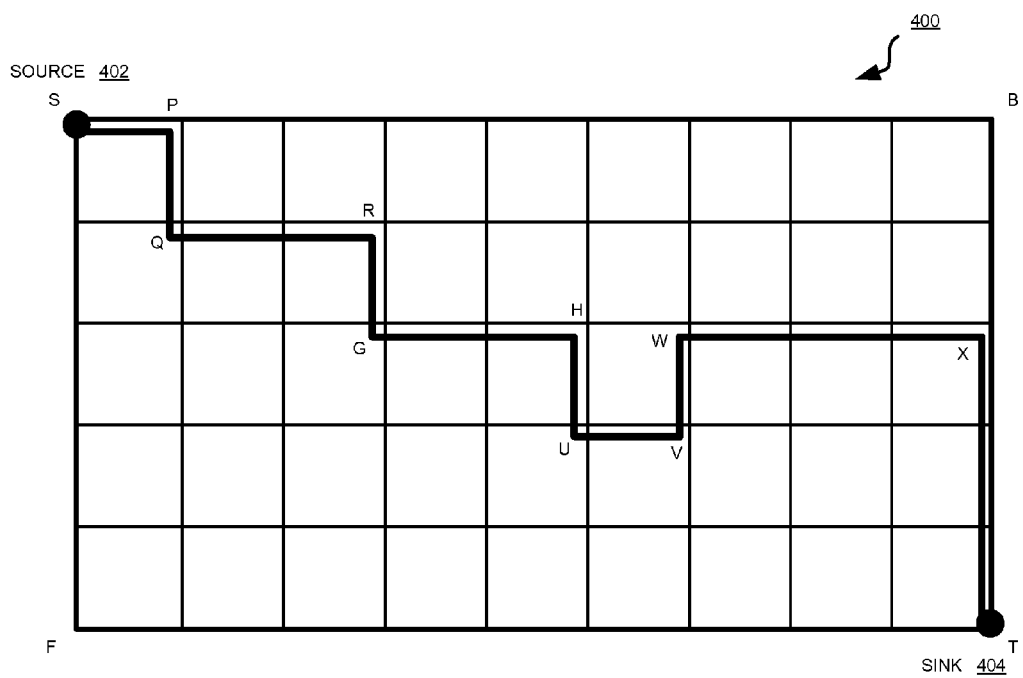
FIG. 4 depicts a block diagram of a bounding area in an IC design layout in which point-to-point routing can be performed in accordance with an illustrative embodiment.

With reference to FIG. 4, this figure depicts a block diagram of a bounding area in an IC design layout in which point-to-point routing can be performed in accordance with an illustrative embodiment. Bounding area 400 is an area of a given IC design layout that includes source pin 402 labeled "S" and sink pin 404 labeled "T". Bounding area 400 includes several blocks as show, each of which is a g-cell. Routing tool, such as routing tool 304 in FIG. 3, uses bounding area 400 to search for possible point-to-point routes between points S and T. For example, in the prior art, the search for point-to-point routing between points S and T includes L route SBT having one turning point, complex maze route SPQRGHUVWXT having nine turning points, and many other solutions with more or less turning points. As is evident from bounding area 400, in a bounding area spanning only forty five g-cells, the possible number of routes can be staggering and evaluating congestions in each such route can be computationally expensive and unnecessary.

Figure 5:
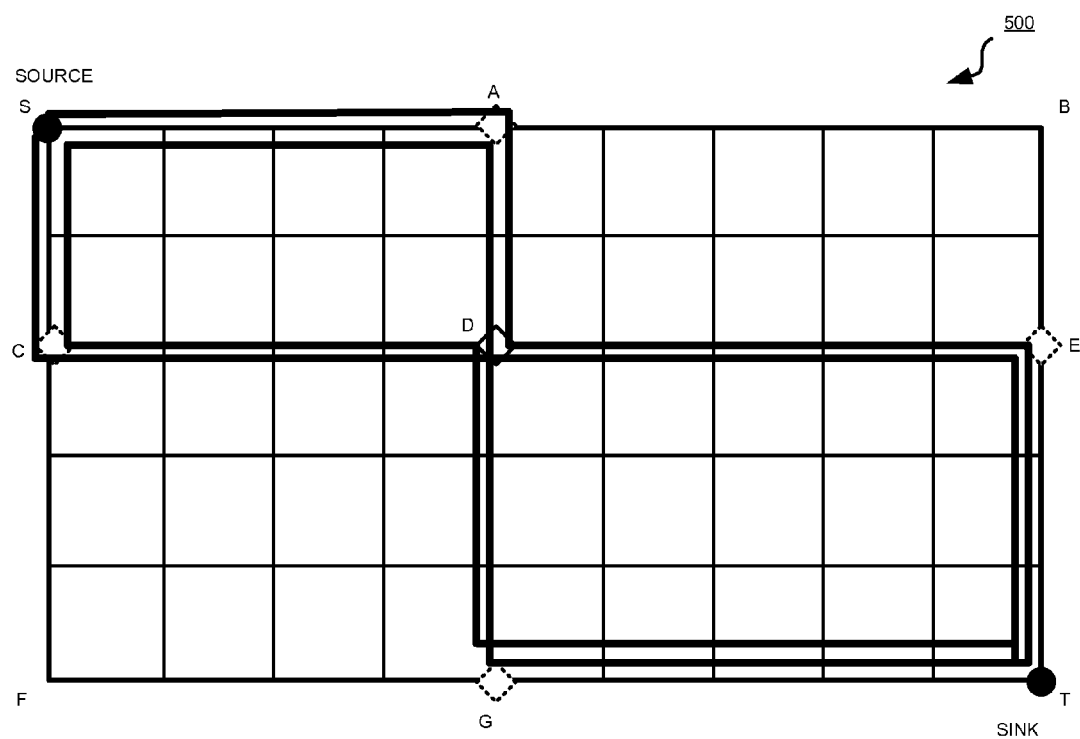
FIG. 5 depicts a block diagram of a configuration for congestion aware point-to-point routing in an IC design using a random point in accordance with an illustrative embodiment.

With reference to FIG. 5, this figure depicts a block diagram of a configuration for congestion aware point-to-point routing in an IC design using a random point in accordance with an illustrative embodiment. Bounding area 500 is analogous to bounding area 400 in FIG. 4. Source pin "S" corresponds to source pin 402 having a similar label in FIG. 4. Sink pin "T" corresponds to sink pin 404 having a similar label in FIG. 4.

An embodiment operating in conjunction with routing tool 304 in FIG. 3 forms an improved routing tool. The improved routing tool selects a random point "D" in bounding area 500. The improved routing tool identifies six possible routes called "pattern routes." The pattern routes include the simplest routes between S and T through bounding area 500 with or without the random point D, which in this example case are the two L routes possible without the random point D, to with, routes SABET and SCFGT. The pattern routes further include the simplest routes using random point D, which in the depicted example case include the only two Z routes possible using the random point D, to with, routes SADGT and SCDET, and the only two W routes possible using the random point D, to wit, routes SADET and SCDGT.

In this example, manner, the improved routing tool's search space is drastically reduced from hundreds of routes to just six routes using a single random point and three or less turning points per route. In the example case depicted in FIG. 5, the pattern routes are limited to one random point and three turning points or less only for the clarity of the description and not as a limitation on the illustrative embodiments. Using the present disclosure, one of ordinary skill in the art will be able to create pattern routes with more than three turns using one random point, create pattern routes with one or more turning points using more than one random points, or a combination thereof. Such pattern routes are contemplated within the scope of the illustrative embodiments.

Presently, a prior art routing tool evaluates congestion in each g-cell whose edge a route crosses. Thus, for route SADET, a prior art routing tool would evaluate congestion conditions in at least twelve g-cells. Advantageously, an embodiment recognizes that evaluating whether congestion exists or congestion is caused by a route is more critical at the g-cells where the point-to-point route makes a turn or terminates, as compared to those g-cells where the route passes straight through. Accordingly, using such an embodiment, the improved routing tool evaluates congestion conditions for route SADET only at five g-cells. For the set of pattern routes depicted in FIG. 5, the improved routing tool only evaluates congestion in at most five g-cells and computes a congestion cost of each of the six routes in terms of congestion in those five g-cells.

As one of ordinary skill in the art will realize from this disclosure, the cost of computations for identifying the pattern routes using random points according to an embodiment, and the cost of computations for calculating the congestion costs of the pattern routes in the manner of an embodiment are substantially less than the cost of identifying point-to-point routes and their congestion costs using a prior art method. Knowing the congestion costs of the pattern routes, the improved routing tool according to an embodiment selects the lowest cost pattern route as the route of choice for point-to-point routing between points S and T.

The improved routing tool according to an embodiment can further refine the point-to-point routing choices. For example, if even the lowest congestion cost among the pattern routes exceeds a congestion threshold, an embodiment performs another iteration of the process described above. For example, one embodiment selects a different random point X (not shown) and repeats the steps of computing the pattern routes and their congestion costs using that different random point X. Another embodiment selects a subarea of bounding area 500 in which to locate the random point.

If the lowest congestion cost in the new set of pattern routes is below the congestion threshold, the pattern route having that lowest congestion cost is selected as the point-to-point route between S and T. An embodiment may limit the number of iterations that can be executed in this manner. Limiting the iterations helps maintain the cost of point-to-point routing computations significantly below the cost of point-to-point routing using presently available methods.

As another example, in one embodiment, it may be known that area ABED in bounding area 500 includes several blockages or congested g-cells. Accordingly, the embodiment may exclude area ABED for placing random point D, and select random point D only in area SADETGFC. Limiting the placement of random point D in a sub-area of bounding area 500 may improve the chances of finding a suitable point-to-point routing in fewer iterations.

Thus, an embodiment produces a point-to-point routing solution in less time and at less computation cost as compared to the presently available methods for point-to-point routing. Furthermore, a point-to-point routing solution produced using one or more random points by an embodiment is congestion aware because the embodiment is able to avoid those pattern routes that are either more congestion causing than other patter routes or can cause congestion violations in certain g-cells.

Figure 6:
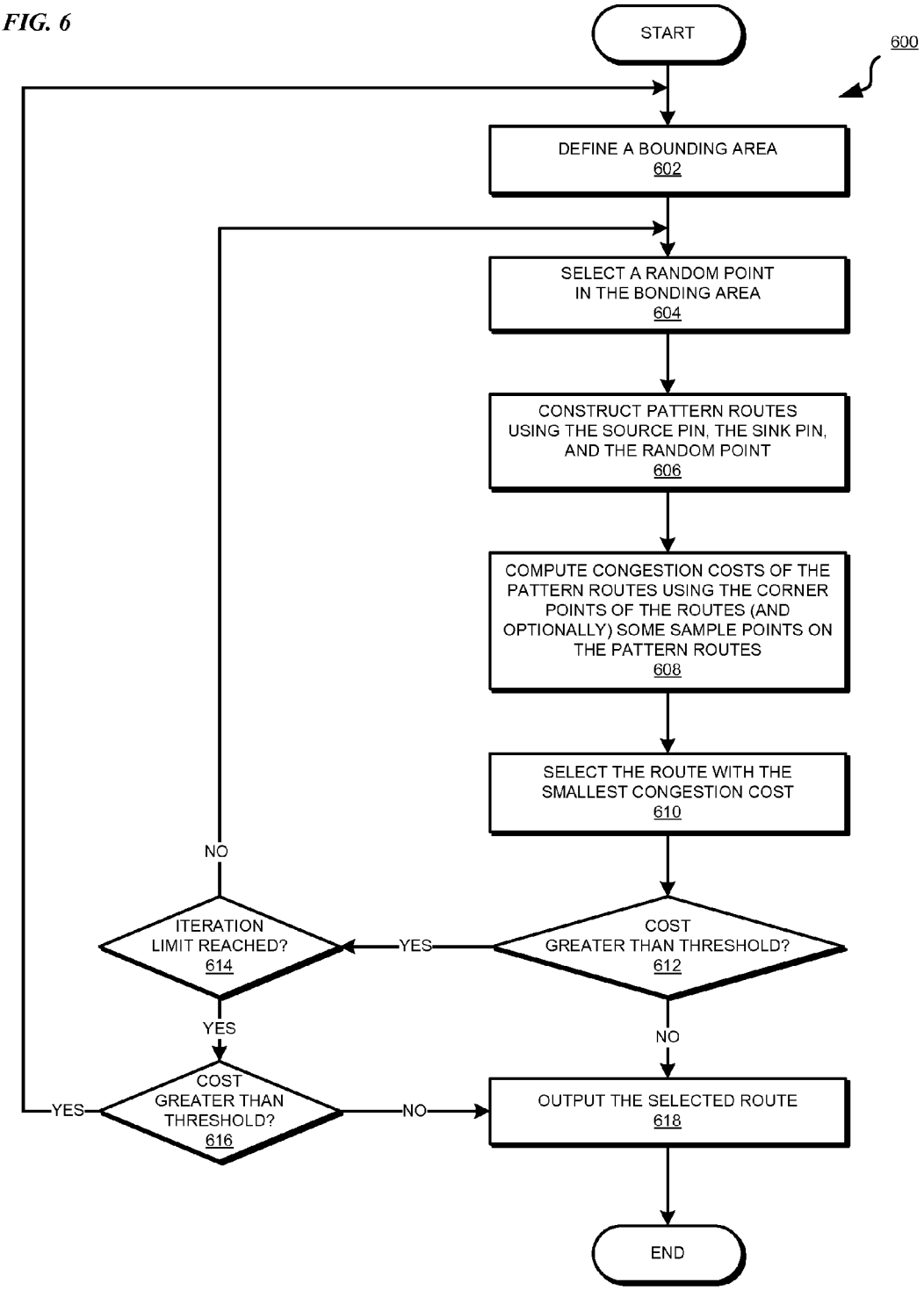
FIG. 6 depicts a flowchart of an example process of congestion aware point-to-point routing using random points in a IC design layout in accordance with an illustrative embodiment.

With reference to FIG. 6, this figure depicts a flowchart of an example process of congestion aware point-to-point routing using random points in a IC design layout in accordance with an illustrative embodiment. Process 600 can be implemented as point-to-point routing step 312 of routing tool 304 in FIG. 3. For example, process 600 can be implemented as application 107 in FIG. 1, and may execute in conjunction with design tool 105 (which in one embodiment includes routing tool 304 of FIG. 3) in FIG. 1. Resulting routing tool 304 is an example of an improved routing tool.

Process 600 begins by defining a bounding area (step 602). Process 600 selects at least one random point in the bounding area (step 604).

Process 600 constructs a set of pattern routes using a combination of a source pin, a sink pin, and one or more of the random points (step 606). Process 600 computes the congestion costs of the pattern routes using the corner points of the routes, such as points A, D, and E in route SADET in FIG. 5, and optionally, some sample points along the pattern routes, such as points A and E in route SABET, (step 608). Process 600 selects the pattern route with the smallest congestion cost computed in step 608 (step 610).

Process 600 determines whether the congestion cost of the pattern route selected in step 610 exceeds a congestion threshold (step 612). If the congestion cost exceeds the congestion threshold ("Yes" path of step 612), process 600 further determines whether a preset number of iterations using random points have been executed (step 614). If the number of iterations executed is less than the preset number limit on the iterations ("No" path of step 614), process 600 returns to step 604 to change on roe more random points in the selection of step 604 and repeat steps 606 et seq. In one embodiment, process 600 returns to step 602 and redefines the bounding area, such as by limiting the random points to a smaller or different bounding area. Process 600 then repeats steps 604 et seq. using the new bounding area definition.

If the number of iterations executed has reaches the preset limit on iterations ("Yes" path of step 614), process 600 determines whether the congestion cost of the lowest cost pattern route computed so far still exceeds the congestion threshold (step 616). If the smallest congestion cost still exceeds the congestion threshold ("Yes" path of step 616), process 600 returns to step 602. For example, in one embodiment process 600 redefines the bounding area, such as by limiting the random points to a smaller or different bounding area and repeats steps 604 et seq. with the new bounding area definition.

If the smallest congestion cost does rot exceed the congestion threshold ("No" path of step 616), process 600 outputs the selected route as the point-to-point route (step 618). Process 600 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for congestion aware point-to-point routing in an IC design layout using one or more random points. Using an embodiment, an improved routing tool can perform point-to-point routing far more efficiently than the presently available methods for point-to-point routing. The point-to-point route selected by an embodiment may or may not be the best point-to-point routing solution between two points, but the point-to-point route selected by the embodiment is an acceptable route, satisfies the design constraints, and is achieved in a cost-efficient manner.

Furthermore, an embodiment can further modify the point-to-point routing process by selecting more than one random points, performing a limited number of iterations of creating pattern routes, redefining the bounding area of one iteration in a subsequent iteration, or a combination thereof. For example, an embodiment may use two random points and create a set of pattern routes including routes with up to four turning points. As another example, an embodiment may exclude a subarea of known congestion from the bounding area such that the random points can only be selected in the remaining subarea of the bounding area.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device," "computer readable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations And/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for congestion aware point-to-point routing using a random point in an integrated circuit (IC) design, the method comprising:
    selecting, using an application executing using a processor and a memory in a data processing system, the random point in a bounding area defined in a layout of the IC design;
    constructing a set of pattern routes between a source pin and a sink pin in the bounding area, a pattern route in the set of pattern routes passing through the random point;
    computing a set of congestion cost corresponding to the set of pattern routes, wherein a congestion cost in the set of congestion costs corresponds to a pattern route in the set of pattern routes;
selecting a preferred pattern route from the set of pattern routes, the preferred pattern route having a smallest congestion cost in the set of congestion costs, wherein responsive to the smallest congestion cost exceeding a congestion threshold, replacing the random point with a different random point, and performing a next iteration of the constructing, the computing, and the selecting, the performing the next iteration being responsive to an iterations limit not being exceeded; and
    outputting the preferred pattern route as a point-to-point route between the source pin and the sink pin.

2. The method of claim 1, further comprising:
    redefining the bounding area as a redefined bounding area, wherein the different random point is selected in the redefined bounding area.

3. The method of claim 1, further comprising:
    defining the bounding area.

4. The method of claim 3, wherein defining the bounding area further comprises:
    identifying a subarea of the bounding area; excluding the subarea from the bounding area such that the random point cannot be located in the subarea.

5. The method of claim 4, wherein the subarea includes a g-cell whose congestion threshold has been reached.

6. The method of claim 1, wherein no pattern route in the set of pattern route includes more than a threshold number of turning points, wherein the set of pattern routes further includes a second pattern route including no more than one turning point and not passing through the random point.

7. The method of claim 1, wherein computing the congestion cost accounts for congestion in only those g-cells that are occupied by a turning point of a pattern route in the set of pattern routes.

8. The method of claim 1, wherein the computing the congestion cost further accounts for congestion in a sample g-cell through which a pattern route in the set of pattern routes passes.

9. The method of claim 1, wherein the random point is one random point in a plurality of random points.

10. The method of claim 1, wherein the bounding area is of an irregular non-geometric shape.

11. A computer usable program product comprising a computer usable storage device including computer usable code for congestion aware point-to-point routing using a random point in an integrated circuit (IC) design, the computer usable code comprising:
    computer usable code for selecting, using an application executing using a processor and a memory in a data processing system, the random point in a bounding area defined in a layout of the IC design;
    computer usable code for constructing a set of pattern routes between a source pin and a sink pin in the bounding area, a pattern route in the set of pattern routes passing through the random point;
    computer usable code for computing a set of congestion cost corresponding to the set of pattern routes, wherein a congestion cost in the set of congestion costs corresponds to a pattern route in the set of pattern routes;
    computer usable code for selecting a preferred pattern route from the set of pattern routes, the preferred pattern route having a smallest congestion cost in the set of congestion costs, wherein responsive to the smallest congestion cost exceeding a congestion threshold, further comprising:
        computer usable code for replacing the random point with a different random point, and performing a next iteration of the constructing, the computing, and the selecting, the performing the next iteration being responsive to an iterations limit not being exceeded; and
    computer usable code for outputting the preferred pattern route as a point-to-point route between the source pin and the sink pin.

12. The computer usable program product of claim 11, further comprising:
    computer usable code for redefining the bounding area as a redefined bounding area, wherein the different random point is selected in the redefined bounding area.

13. The computer usable program product of claim 11, further comprising:
    computer usable code for defining the bounding area.

14. The computer usable program product of claim 13, wherein defining the bounding area further comprises:
    computer usable code for identifying a subarea of the bounding area; excluding the subarea from the bounding area such that the random point cannot be located in the subarea.

15. The computer usable program product of claim 14, wherein the subarea includes a g-cell whose congestion threshold has been reached.

16. The computer usable program product of claim 11, wherein the computer usable code is stored in a computer readable storage device in a data processing system, and wherein the computer usable code is transferred over a network from a remote data processing system.

17. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

18. A data processing system for congestion aware point-to-point routing using a random point in an integrated circuit (IC) design, the data processing system comprising:
    a storage device, wherein the storage device stores computer usable program code; and
    a processor, wherein the processor executes the computer usable program code, and wherein the computer usable program code comprises:

computer usable code for selecting, using an application executing using a processor and a memory in a data processing system, the random point in a bounding area defined in a layout of the IC design;

computer usable code for constructing a set of pattern routes between a source pin and a sink pin in the bounding area, a pattern route in the set of pattern routes passing through the random point;

computer usable code for computing a set of congestion cost corresponding to the set of pattern routes, wherein a congestion cost in the set of congestion costs corresponds to a pattern route in the set of pattern routes;

computer usable code for selecting a preferred pattern route from the set of pattern routes, the preferred pattern route having a smallest congestion cost in the set of congestion costs, wherein responsive to the smallest congestion cost exceeding a congestion threshold, further comprising:

computer usable code for replacing the random point with a different random point, and performing a next iteration of the constructing, the computing, and the selecting, the performing the next iteration being responsive to an iterations limit not being exceeded; and computer usable code for outputting the preferred pattern route as a point-to-point route between the source pin and the sink pin.

* * * * *